April 14, 1936.  D. C. SCOTT  2,037,273
FILAMENT TESTING APPARATUS
Filed Jan. 26, 1932  3 Sheets-Sheet 3

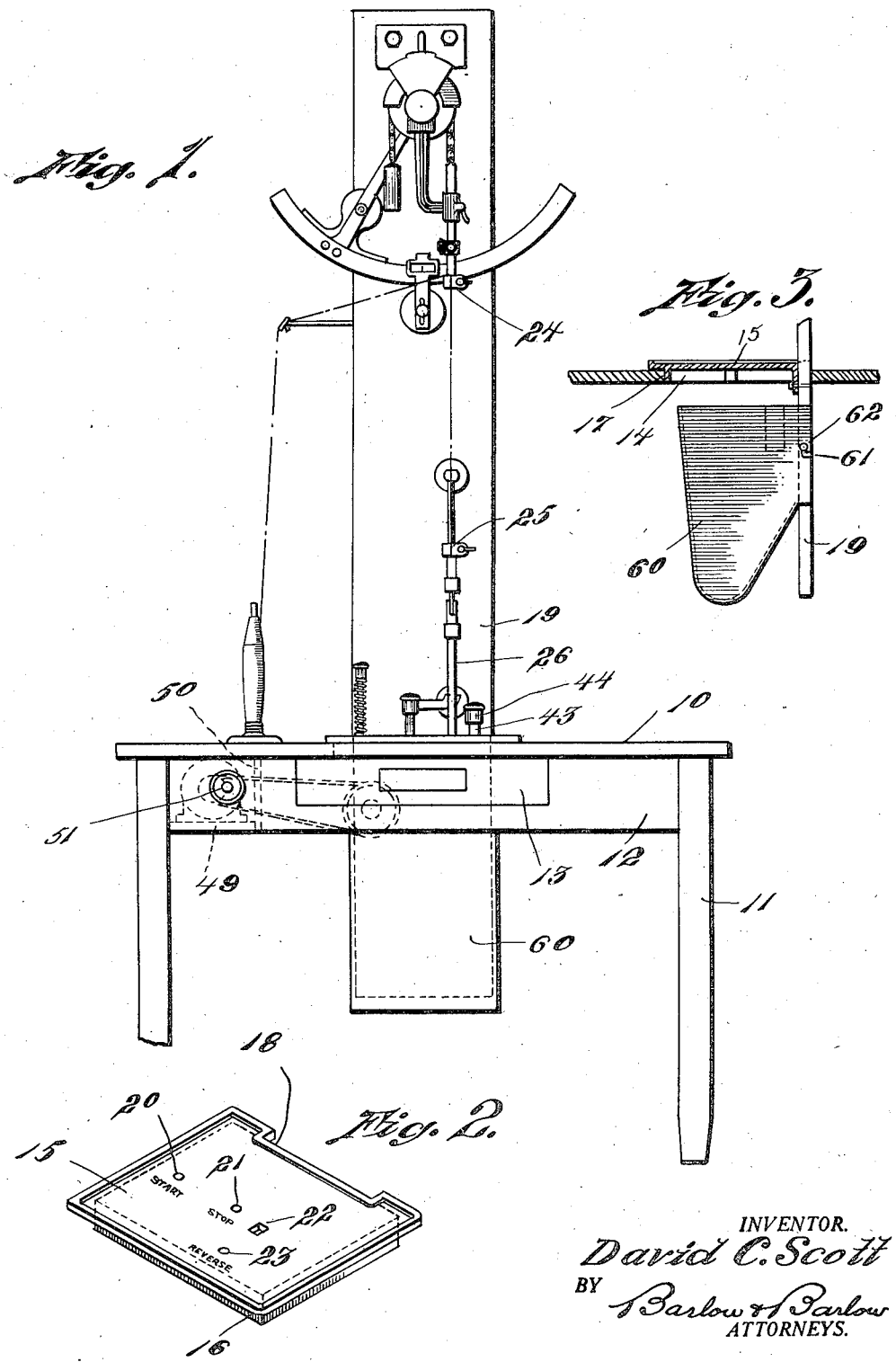

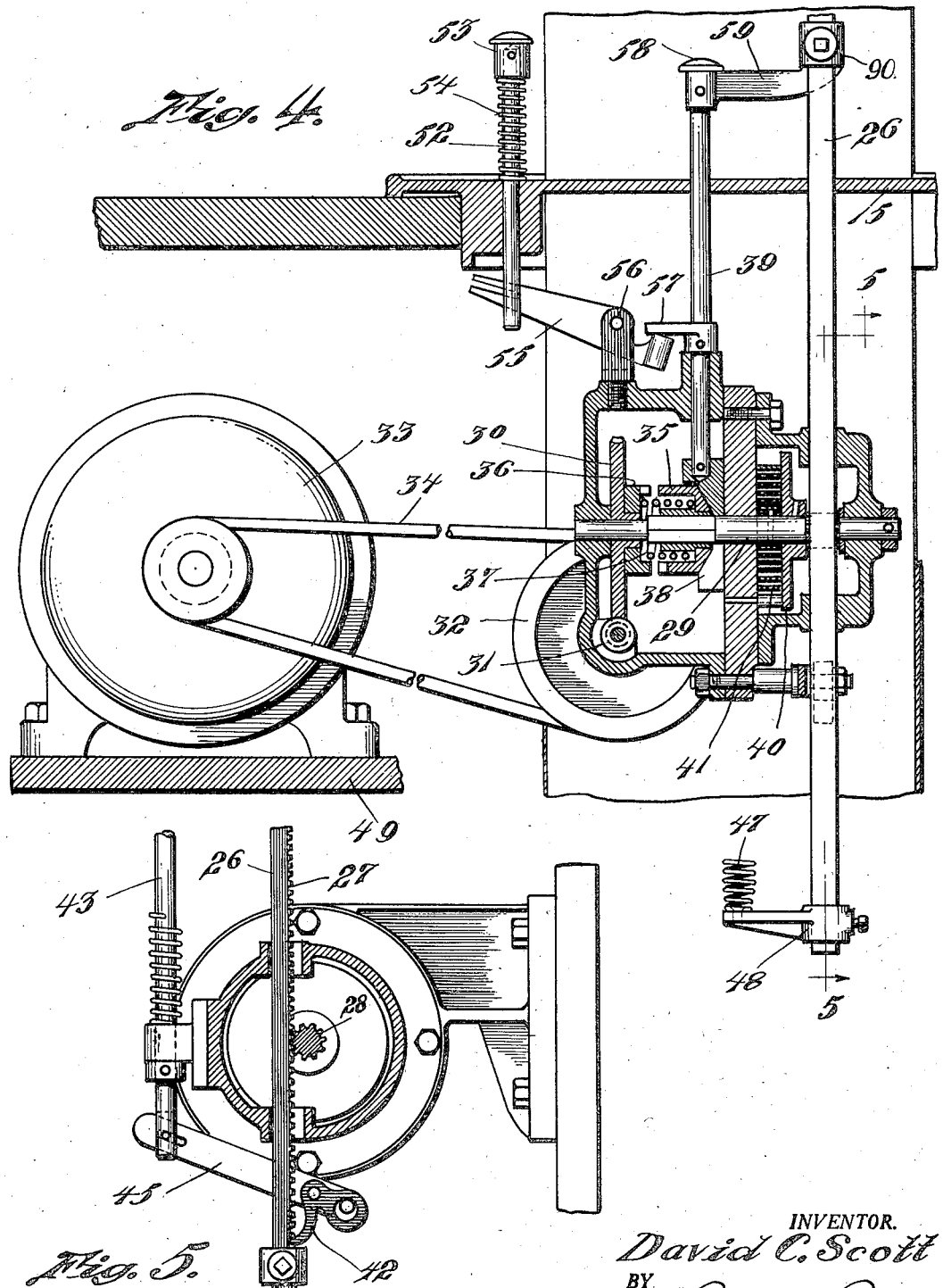

INVENTOR.
David C. Scott
BY Barlow & Barlow
ATTORNEYS.

Patented Apr. 14, 1936

2,037,273

UNITED STATES PATENT OFFICE 2,037,273

FILAMENT TESTING APPARATUS

David C. Scott, Providence, R. I., assignor to Henry L. Scott Company, a corporation of Rhode Island Application January 26, 1932, Serial No. 588,963

8 Claims. (Cl. 265—17)

This invention relates to a testing apparatus, and has for its object to provide an arrangement whereby the operator may be seated at his or her work, and yet be protected from the operating parts of the apparatus toward which the knees of the operator may extend.

Another object of this invention is the mounting of testing apparatus in a table with the power parts such as the motor, transmission gears and the like below the table out of sight, and which may be controlled from the top of the table.

Another object of the invention is the moving of a graduated scale rather than a pointer over the scale.

Another object of the invention is the provision of a plurality of scales and an indicating device which may be adjusted to obscure all but one of the scales, the same being relatively moved one with reference to the other.

A further object of the invention is the provision of a securing means adjacent to the work clamp to hold the work clamp in a position to have the scale read zero upon the start of a test and which may be in a convenient location for manipulation by the operator.

A still further object of the invention is the provision of spring means for returning the pull bar to starting position, which spring is energized by movement of the pull bar in making the test on the specimen.

With these and other objects and advantageous features in view, the invention consists of a novel arrangement of parts more fully disclosed in the detailed description following, in conjunction with the accompanying drawings, and more particularly set forth in the appended claims.

In the drawings:

Fig. 1 is a front elevation of the table and testing apparatus mounted thereon;

Fig. 2 is a perspective view of the plate through which the upright support of the testing unit and the controls for the operation of the testing unit are mounted;

Fig. 3 is a fragmental section indicating the mounting of the guard for covering the operating portion of the testing unit with the controls and other portions of the testing unit removed;

Fig. 4 is a sectional fragmental view on a larger scale, showing the form of the controls for the gearing mechanism of the power portion of the testing unit, and also showing an electric motor for operating the same;

Fig. 5 is a further fragmental detail taken on substantially line 5—5 of Figure 4 and indicating an additional control member in a different plane from the section shown in Figure 4;

Figures 6, 7:
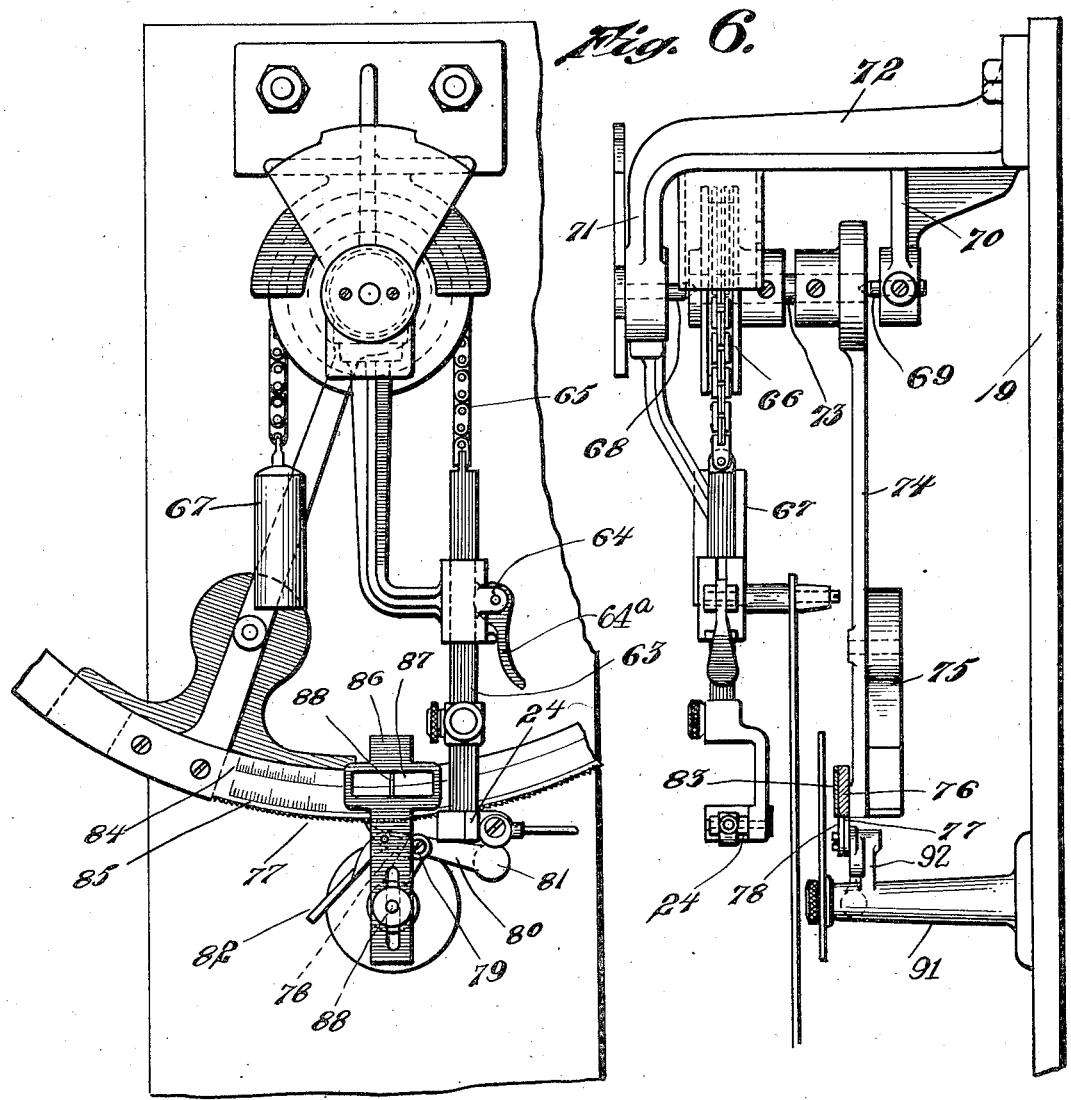
Fig. 6 is a front elevation of the upper and indicating part of the testing unit with the support board broken away.
Fig. 7 is a side elevation thereof showing in section the quadrant and scale mounted thereon.

In the operation of testing apparatus for testing relatively small speciments such as yarn or the like, it is found that the operator may be seated at the work and still perform his functions satisfactorily, and in order that this may be accomplished more advantageously, I have combined a testing unit and table by mounting the testing apparatus through a table top with the specimen clamps and indicating portion thereof above the top for ready access and observance and the power parts below the table where they are out of sight, and have provided controls extending through the table top for these power parts, thus enabling an operator to be seated at the work, and while so seated position the specimen and start the test from the controls; and in addition, I have provided a convenient and advantageous securing means for holding the rod connecting the specimen and the indicating portion of the device in zero position during the fixing of the specimen in the work clamps, and have also provided on the swinging weight arm a quadrant which may have two scales thereon, one of which may be hidden, and the other viewed through a window in a member which has an indicating line or mark thereon to determine the amount of movement of the quadrant relative thereto, the member being adjustable to permit either scale to be observed, depending upon the test being made; and I have also provided a spring for returning the pull bar to its raised position, which spring is energized by an operation of the bar in pulling the specimen; and the following is a detailed description of the present embodiment of this invention, illustrating the preferred means by which these advantageous results may be accomplished.

With reference to the drawings, 10 designates the table top having legs 11 and sides including a front wall 12 and similarly extending back and end walls on the other sides of the table. A drawer 13 may be provided extending through the front wall 12 if desired. An opening 14 in the table top receives a plate 15 having flanges 16 to engage the edges 17 of the opening and retain the same in position, the plate being notched as at 18 to accommodate the upright vertically arranged back board 19 of the testing unit for mounting the various parts, and the plate also is provided with openings 20, 21, 22 and 23 for the accommodation of controls and the pull bars as will be hereinafter described.

The specimen to be tested is clamped between the upper clamp 24 and the lower clamp 25 and pull is applied to the lower clamp 25 through the pull rod 26 suitably connected thereto and extending through the opening 22 in the plate 15. This pull rod 26 is provided with a rack 27 with which pinion gear 28 engages for moving the rod 26 downwardly. The pinion 28 is mounted on the shaft 29 which is moved by worm gear 30 meshing with the worm 31 operated through a suitable train of gears, not shown, from the drive pulley 32 and motor 33 connected thereto by a belt 34, the worm gear 30 and shaft 29 being connected through suitable clutch parts 35 and 36 having a spring 37 tending to force them apart. The clutch part 35 is slidably mounted on the shaft 29 and is provided with a tapered end. A yoke member 38 positioned to straddle the shaft 29 has a straight side in sliding contact with one wall of the casing adjacent to this shaft 29. The opposite side of the yoke has an inwardly tapered portion which provides a recess for the tapered end on the clutch part 35 when the clutch elements are disengaged. To engage the clutch parts, a slidably mounted rod 39 which is secured to the yoke is moved upwardly and raises this yoke in a straight path and forces the clutch part 35 out of the recess and into engagement with the member 36. The lower portion of the yoke then becomes interposed between the tapered end and the wall of the casing adjacent the shaft 29 and prevents the disengagement of the clutch parts by the urging of the spring 37 therebetween.

A spring 41 has one end secured to the shaft 29 and the other end secured to the wall of the casing and the rotation of the shaft 29 to move the rod 26 downwardly winds the spring to energize and place the same under tension. A spacing disk 40 is interposed between the pinion 28 and the spring 41. The pawl 42 engages with the rack 27 and is released through a link 45 by means of pressing downwardly control rod 43 extending through plate 15 and having handle or button top 44 thereabove, whereby upon release of the clutch parts 35 and 36, the spring 41 operates to rotate the shaft in the opposite direction and move the rod 26 to its initial starting position, the raising action of which is cushioned by means of a spring 47 mounted on the bracket arm 48 at the end of the rod 26.

The electric motor through which energy is supplied to the power mechanism is mounted on a platform 49 suspended from the table top by means of a hanger 50 and is controlled through an electric switch 51 mounted upon the front wall 12 of the table.

In order to start the downward movement of the pull rod 26, rod 52 having handle 53 is pressed downwardly against the spring 54 to swing the link 55 about its pivot 56 and raise the rod 39 by engagement with the abutment 57 thereon to move the clutch parts into engagement, and if it is desired to stop the downward movement of the rod 26 at any time, the handle 58 of the rod 39 may be engaged and forced downwardly through the plate 15. It is convenient, however, to provide a stop 90 adjustably secured on the rod 26 to engage an arm 59 extending from the handle 58 and positioned in the path of travel of said stop. A predetermined movement of the rod 26 downwardly will cause the stop to engage and move the arm and the rod 39 to disconnect the clutch parts to stop the action of the machine.

A guard 60 is provided to cover the power mechanism of the device and prevent the operator sitting at the table engaging the same, and may be mounted upon the back board 19 by means of bayonet slots 61 at either side to extend over a pin 62 in the edge thereof.

The indicating mechanism for the test is secured to the upper clamp 24 and consists of a rod 63 extending through a guide bracket 64 secured to the back board 19 and connected to a chain 65 extending over and secured to a drum 66 which is provided with a counterweight 67 at its opposite end. A cam-shaped locking member 64a is pivotally mounted on the bracket 64 and is used to lock the rod 63 to the bracket 64 in any desired position when fixing a specimen in the clamp 24. The bracket 64 is split so as to allow the larger portion of the cam lobe to be forced in contact with the adjacent side of the rod 63 when the locking member 64a is in the position shown in Fig. 6 and thus tightly bind the rod 63 in the bracket. The drum 66 is mounted between conical bearings 68 and 69 suitably supported from arms 70 and 71 of the bracket 72 which is secured to the upright board 19. A shaft 73 is movable with drum 66 from which shaft an arm 74 depends. Upon this arm which swings with the shaft a weight 75 is detachably secured so that this weight may be removed and weights of different mass be substituted for varying the capacity of the machine.

A quadrant 76 is mounted on this arm 74 which is provided with rack teeth 77. A support 91 extends forwardly from the back board 19 from which an arm 92 projects. On this arm 92 a lever 80 is pivoted at 79, which lever is enlarged at one end 81 to swing it in one direction. Upon this lever two or more pawls 78 are pivoted which engage the rack teeth 77. The pawls are pivoted at one side of the pivot 79 so that when the handle end 82 of the lever is engaged and swung down to lift the opposite weighted end, the pawls will be disengaged from the rack to permit it to return to starting position under influence of its weighted arm 74.

Upon the quadrant 76, a graduated indicating scale 83 is mounted having two different scales 84 and 85 arranged concentrically thereon, and a member 86 having a window 87 therein is adjustably mounted as at 88 to be moved to position this window over either the scale 84 or 85 and to obscure or hide from view the other, whereby no mistake can be made as to which scale is to be used in the successive tests. It is to be understood that the indicator member 86 will be adjusted in accordance with the size of the weight member member 75 used, so that the correct indication of force will be effected by exposing the proper one of the scale members 84 and 85 respectively. An indicating marker 88 extends across the window and which is relatively fixed with reference to the scale to permit accurate reading of the device.

While I have described certain construction forms which embody the principles of my invention, it is obvious that other desired changes in arrangement may be made within the spirit and the scope of the invention as defined in the appended claims.

I claim:

1. In combination with a table having a top with a side wall extending along the front thereof, a testing unit mounted through the top of said table provided with specimen holding and test indicating means located thereon above the top of said table, mechanism for connecting one of said holding means and the indicating means, pulling means secured to the other holding means including operating gears through which pull is applied to the specimen located below the top of the table, a motor secured to the underside of the table and hidden from view from the front by said wall and table top, and means connecting the motor with the pulling means, said specimen-holding means being so positioned relative to the table top as to be within the reach of the operator seated thereat.

2. In combination with a table having a top with a side wall extending along the front thereof, a testing unit mounted through the top of said table provided with specimen holding and test indicating means located thereon above the top of said table, mechanism for connecting one of said holding means and the indicating means, pulling means secured to the other holding means including operating gears through which pull is applied to the specimen located below the top of the table, a motor secured to the underside of the table and hidden from view from the front by said wall and table top, means connecting the motor with the pulling means, and means extending through the readily accessible surfaces of said table for controlling the motor and pulling means, said specimen-holding means and said control means being so positioned relative to said table top as to be within the reach of the operator seated thereat.

3. In combination with a table having a top with a side wall extending along the front thereof, a testing unit mounted through the top of said table provided with specimen holding and test indicating means located thereon above the top of said table, mechanism for connecting one of said holding means and the indicating means, pulling means secured to the other holding means including operating gears through which pull is applied to the specimen located below the top of the table, a motor secured to the underside of the table and hidden from the front by said wall and table top, means connecting the motor with the pulling means, and means mounted on the outer surface of said wall for controlling the operation of said motor, said specimen-holding means being so positioned relative to the table top as to be within the reach of the operator seated thereat.

4. In combination with a table having a top with a side wall extending along the front thereof, a testing unit mounted through the top of said table provided with specimen holding and test indicating means located thereon above the top of said table, mechanism for connecting one of said holding means and the indicating means, pulling means secured to the other holding means including operating gears through which pull is applied to the specimen located below the top of the table, a motor secured to the underside of the table and hidden from the front by said wall, means connecting the motor with the pulling means, means mounted on the outer surface of said wall for controlling the operation of said motor, and means extending through the table top to control the operation of said pulling means, said specimen-holding means and said pulling means control being so positioned relative to the table top as to be within the reach of the operator seated thereat.

5. In combination, a table having a top with an opening in the top, a plate inset into said opening, a testing unit mounted on the table through said plate and having power mechanism located below the table top, and control means for said power mechanism extending through said plate and operable from above said top.

6. In combination, a table having a top with an opening in the top, a plate inset into said opening and having a flange engaging the edges thereof, a testing unit mounted on the table through said plate and having power mechanism located below the table top, and control means for said power mechanism extending through said plate and operable from above said top.

7. In a testing device, indicating mechanism, work clamps, means for connecting one of said clamps to the indicating mechanism including a rod, a guide for the rod adjacent said clamp, and a cam mounted on said guide and movable into engagement with said rod to secure it in desired position when fixing a specimen in the work clamps, whereby the indicator means may be started in the desired position.

8. In a testing device, indicating mechanism, work clamps, means for connecting one of said clamps to the indicating mechanism including a rod, and means for clamping said rod in any desired position against movement in either direction when fixing a specimen in the work clamps whereby the indicating means may be started in the desired position.

DAVID C. SCOTT.